US009392564B2

(12) United States Patent
Chou et al.

(10) Patent No.: US 9,392,564 B2
(45) Date of Patent: Jul. 12, 2016

(54) APPARATUS AND METHOD FOR MERGING BEACON TRANSMISSION AND RECEPTION

(75) Inventors: Chun-Ting Chou, Taipei (TW); Hong Zhai, Ossining, NY (US); Richard Chen, Croton-on-Hudson, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1053 days.

(21) Appl. No.: 12/522,957

(22) PCT Filed: Jan. 15, 2008

(86) PCT No.: PCT/IB2008/050128
§ 371 (c)(1),
(2), (4) Date: Feb. 9, 2010

(87) PCT Pub. No.: WO2008/087587
PCT Pub. Date: Jul. 24, 2008

(65) Prior Publication Data
US 2010/0142443 A1   Jun. 10, 2010

Related U.S. Application Data

(60) Provisional application No. 60/885,167, filed on Jan. 16, 2007.

(51) Int. Cl.
*H04W 56/00* (2009.01)
*H04W 48/16* (2009.01)

(52) U.S. Cl.
CPC ............ *H04W 56/002* (2013.01); *H04W 48/16* (2013.01)

(58) Field of Classification Search
None
See application file for complete search history.

(56) References Cited

U.S. PATENT DOCUMENTS

| 2005/0249173 A1* | 11/2005 | Salokannel et al. | 370/338 |
| 2006/0018298 A1 | 1/2006 | Dilipkumar | |
| 2006/0040701 A1 | 2/2006 | Long | |
| 2006/0245440 A1 | 11/2006 | Mizukoshi | |
| 2007/0165589 A1* | 7/2007 | Sakoda | 370/345 |
| 2008/0259895 A1* | 10/2008 | Habetha et al. | 370/345 |
| 2008/0298329 A1* | 12/2008 | Mo et al. | 370/338 |
| 2009/0232057 A1* | 9/2009 | Doi et al. | 370/328 |

FOREIGN PATENT DOCUMENTS

| EP | 1641180 | * | 3/2006 |
| EP | 1641180 A1 | | 3/2006 |
| WO | WO2006087677 | * | 8/2006 |
| WO | WO2006087677 A1 | | 8/2006 |

* cited by examiner

*Primary Examiner* — Mohammad Adhami
(74) *Attorney, Agent, or Firm* — Larry Liberchuk

(57) ABSTRACT

A method and wireless device merge multiple unsynchronized beacon groups in a wireless network, each beacon group including at least one wireless device. A first beacon is received from at least one first wireless device in a first beacon group (S514), the first wireless device having a first directional antenna. A second beacon is received from at least one second wireless device in a second beacon group that is not synchronized with the first beacon group (S516), the second wireless device having a second directional antenna. A first response beacon is relocated (S520) and sent (S522) to the first wireless device in the first beacon group. The relocated first response beacon instructs the first wireless device to relocate the first beacon. Accordingly, the second beacon, the relocated first response beacon, and the relocated first beacon are synchronized.

20 Claims, 6 Drawing Sheets

APPARATUS AND METHOD FOR MERGING BEACON TRANSMISSION AND RECEPTION

CROSS REFERENCE TO RELATED APPLICATION

A claim of priority is made to U.S. Provision Application No. 60/885,167, filed Jan. 16, 2007, the subject matter of which is hereby incorporated by reference. Further, the applications is related to U.S. Provisional Application entitled, "Apparatus and Method for Enabling Discovery of Wireless Devices," by Richard Chen and Chun-Ting Chou, the subject matter of which is hereby incorporated by reference.

BACKGROUND AND SUMMARY

Advancements continue to be made in wireless communications technology. For example, wireless local area networks (WLANs) and wireless personal area networks (WPANs) networks are becoming more common in homes and businesses. Such networks may include a variety of independent wireless electronic devices or terminals, which wirelessly communicate with one another. WLANs and WPANs may operate according to a number of different available standards, including IEEE standards 802.11 (Wi-Fi), 802.15 (Bluetooth) and 802.16 (WiMax), as well as the WiMedia Alliance Ultra-Wideband (UWB) standard.

FIG. 1 is a block diagram showing a conventional wireless network 100, including multiple terminals configured to communicate with one another over exemplary WPAN 125. The wireless terminals may include any electronic devices or nodes configured to communicate with one another. For example, FIG. 1 depicts a home network in which the electronic devices include a personal computer 120, a digital television set 121, a digital camera 122 and a personal digital assistant (PDA) 123. The network 100 may also include an interface to other networks, such as modem 130, to provide connectivity of all or some of the wireless devices 120-123 to the Internet 140, for example. Of course, there are many other types of wireless networks in which electronic devices communicate with one anther, including networks in manufacturing plants, medical facilities, security systems, and the like.

Wireless devices may communicate with one another using directional antennas, which may be fixed or steerable, for extending transmission range. For example, recent wireless networks (e.g., WiMedia wireless USB) operate in very high frequency bands (e.g., 60 GHz), and thus use directional antennas to compensate for high path loss associated with high frequency bands. In both centralized and distributed wireless networks, wireless devices using directional antennas must align their respective antennas at the same time in order to communicate. In other words, the wireless devices must first find each other. When the wireless devices have steerable directional antennas, this may be accomplished by simultaneously scanning (e.g., sweeping their antenna beams) around surrounding areas. The wireless devices may not discover one another unless there is pre-coordination among them to assure that they are sweeping their antenna beams at the same time. When the wireless devices have fixed directional antennas, they will discover only those devices located within the fixed antenna beam.

Beacons are widely used to convey important control information between devices. Beacons are usually broadcast so that all devices in the transmission range of the beaconing device can receive the beacons. For example, an IEEE 802.11 access point periodically sends out beacons so that the IEEE 802.11 wireless devices around the access point can associate with the access point and communicate. As stated above, in wireless networks in which directional antennas are used, beacons may only be sent in certain directions. As a result, only a limited number of devices in proximity of the beaconing device will receive the beacons. The wireless devices may be pre-programmed to know the direction of each other's antennas, but this requires a protocol to coordinate the wireless devises' antenna directivity, as well as beacon transmission, reception and processing.

In other words, wireless devices may not be able to discover and communicate with each other even though they are in the same network 100 and in proximity to one another. Such coordination or synchronization is difficult and costly to implement. However, wireless devices not having a common time-domain reference point for coordinating antenna control and/or beacon transmission will not communicate properly as a network.

Furthermore, wireless devices in proximity with one another may not necessarily be able to communicate, depending on their relative locations and the directional capabilities of their antennas. This is especially true for wireless devices having fixed directional antennas. Accordingly, a situation may arise in which wireless devices in a wireless network (e.g., network 125) form multiple, independent beacon groups, each of which includes one or more of the wireless devices.

Such beacon groups are unsynchronized and not able to directly communicate with one another. For example, if two wireless devices having fixed directional antennas are not located within one another's antenna sectors, the two wireless devices necessarily form two separate beacon groups. A third wireless device, e.g., with a steerable directional antenna, may be able to communicate with both beacon groups. However, the third wireless device must choose one of the beacon groups to join, or decide to join both beacon groups, in which case it must send two beacons, possibly in different antenna sectors. Sending two beacons, however, perpetuates the unsynchronized beacon groups, thus wasting medium time and potentially causing interference.

Accordingly, it would be desirable to provide wireless devices and a method of wireless communications that provide a mechanism enabling wireless devices to find and communicate with each other, using a single synchronized beacon group, particularly when the wireless devices are using fixed directional antenna systems.

In accordance with a representative embodiment, a method of merging a plurality of unsynchronized beacon groups in a wireless network, each beacon group comprising at least one wireless device, comprises:

receiving a first beacon from at least one first wireless device in a first beacon group, the first wireless device having a first directional antenna;

receiving a second beacon from at least one second wireless device in a second beacon group that is not synchronized with the first beacon group, the second wireless device having a second directional antenna; and relocating a first response beacon and sending the relocated first response beacon to the first wireless device in the first beacon group, the relocated first response beacon instructing the first wireless device to relocate the first beacon, wherein the second beacon, the relocated first response beacon, and the relocated first beacon are synchronized.

In accordance with another representative embodiment, an apparatus configured to merge a plurality of unsynchronized beacon groups in a wireless network, each beacon group comprising at least one wireless device includes:

a transceiver configured to receive a first beacon from at least one first wireless device in a first beacon group, the first wireless device having a first directional antenna, and to receive a second beacon from at least one second wireless device in a second beacon group that is not synchronized with the first beacon group, the second wireless device having a second directional antenna; and a processor configured to synchronize a timing of a first response beacon, responsive to the first beacon, with a timing of the second beacon by relocating the first response beacon, wherein the transceiver sends the relocated first response beacon to the first wireless device in the first beacon group, the relocated first response beacon informing the first wireless device to synchronize a timing of the first beacon with the timing of the second beacon by relocating the first beacon.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known devices and methods may be omitted so as to not obscure the description of the example embodiments. Such methods and devices are clearly within the scope of the present teachings.

In the various embodiments, a protocol forms and controls beacon groups and beacons, sent and received through fixed and steerable directional antennas of wireless devices in a wireless network, such as a WLAN or WPAN. The protocol provides wireless devices the ability to transmit beacons in a coordinated manner in a WLAN or WPAN using directional antennas. The wireless devices are thus able to exchange information via beacons in a synchronized manner, even when the wireless devices would otherwise form separate beacon groups, to enable network management, data transmission and other communications, without having to previously coordinate antenna directivity or time synchronization of the wireless devices and/or the associated beacon groups.

Figure 1:
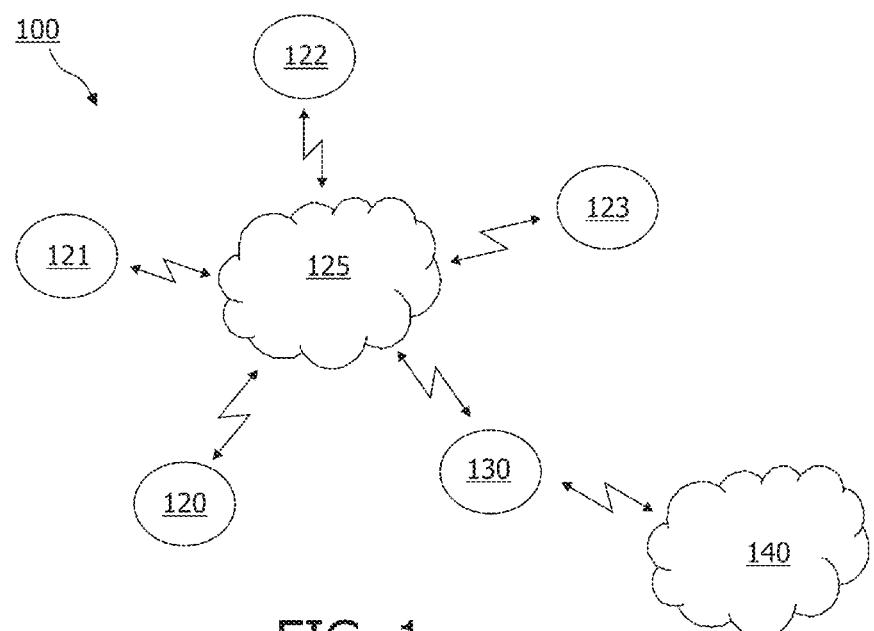
FIG. 1 is a block diagram of a conventional wireless communications network.
Figure 2:
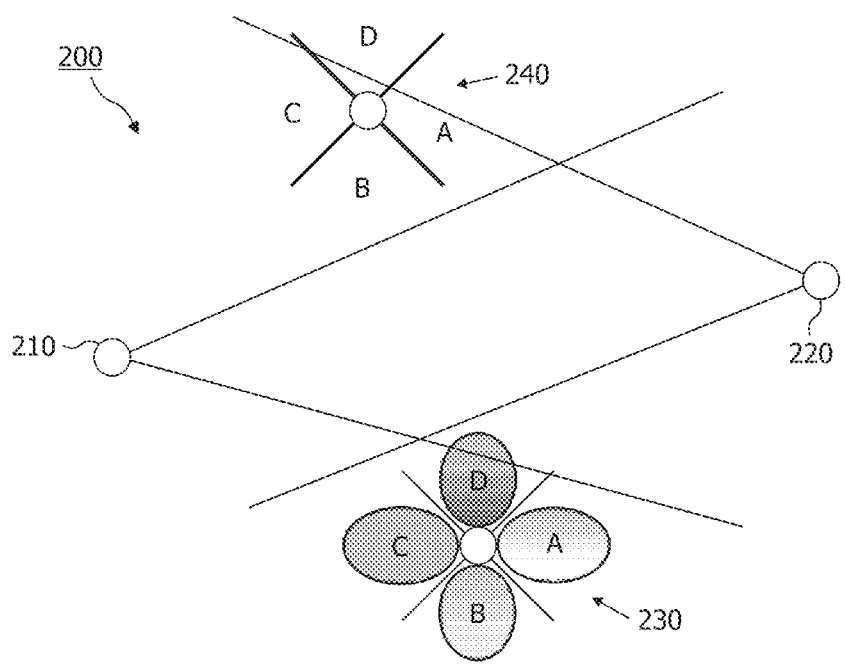
FIG. 2 is a block diagram of representative wireless devices communicating in a wireless network according to various embodiments.

FIG. 2 is a block diagram of a representative wireless network 200, which may be a WLAN, WPAN, or the like, according to various standards and protocols, such as the WiMedia UWB standard, for example. Each representative wireless device 210, 220, 230 and 240 of wireless network 200 transmits and receives beacons through directional antennas. Wireless devices 210 and 220 use fixed beam directional antennas, indicated by the v-shaped, overlapping coverage areas. Wireless devices 230 and 240 use steerable directional antennas (e.g., steering or switching-beam antennas), and are thus able to cover a wide area by beam sweeping/switching. In the example of FIG. 2, wireless device 230 is indicated to be a primary device, in that it actively transmits beacons in each of its antenna sectors, indicated by shaded regions A, B, C and D. The wireless device 230 may be a network access point, for example.

The location and direction of the wireless devices 210, 220, 230 and 240 are not known a priori by one another. Therefore, upon entering the network 200 (e.g., powering on), wireless device 240, for example, may not know the location of the other devices (e.g., wireless devices 210, 220, 230) or in which direction to point its antenna to establish communications with the other devices. Wireless device 240 therefore scans all of its antenna sectors (depicted as sectors A-D) to listen for beacons. FIG. 2 depicts wireless device 240, as well as wireless device 230, as having four antenna sectors for purposes of discussion. It is understood that these devices may have any number of antenna sectors, without departing from the spirit and scope of the various embodiments.

Wireless devices 210 and 220, which exchange beacons through their respective fixed beam antennas, form a first beacon group. Wireless device 230 is located outside of the fixed antenna sectors of both wireless devices 210 and 220, and thus cannot transmit or receive beacons to or from wireless devices 210 and 220. In other words, wireless devices 210 and 220 are hidden to wireless device 230, and vice versa. Accordingly, wireless device 230 forms a second beacon group, which is independent of and unsynchronized with the first beacon group.

Wireless device 240, which has a steerable directional antenna, is within the fixed antenna sector of wireless device 220 and within one of the multiple antenna sectors of wireless device 230. More particularly, sector A of wireless device 240 aligns with the fixed antenna sector of wireless device 220 and sector B of wireless device 240 aligns with sector D of wireless device 230. Therefore, when wireless device 240 enters the network (e.g., powers on), it is able to receive beacons from and transmit beacons to both wireless devices 220 and 230. (Wireless device 240 is not able to exchange beacons directly with wireless device 210, however, because it is located outside the fixed antenna sector of wireless device 210.) Wireless device 240 is therefore common to both beacon groups.

Figure 3:
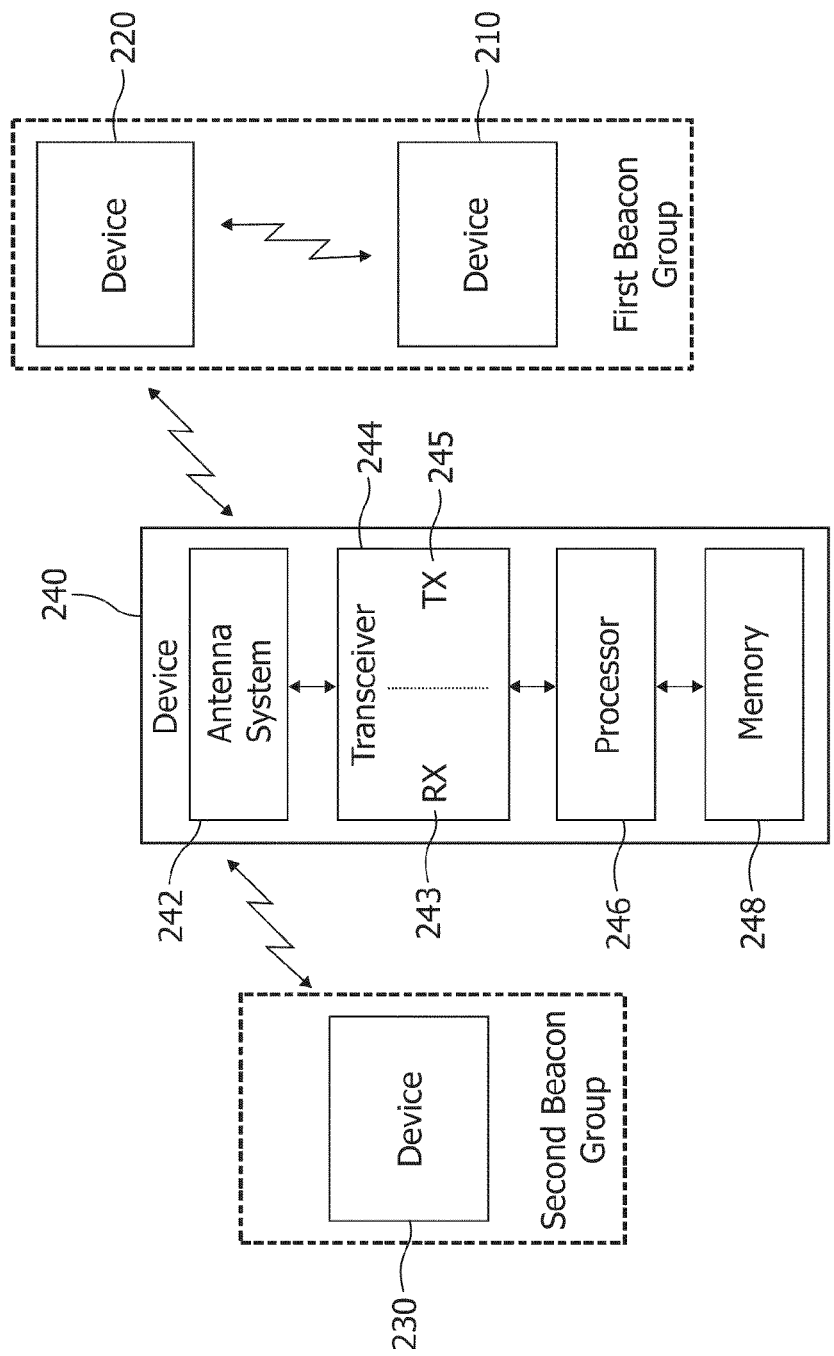
FIG. 3 is a functional block diagram of representative wireless devices in beacon groups according to various embodiments.

FIG. 3 is a functional block diagram of representative wireless device 240, configured to communicate with representative wireless devices 220 and 230, with which wireless device 240 is able to exchange beacons, according to various embodiments. Although wireless device 240 is shown and discussed in detail, it is understood that the wireless devices 220 and 230 (as well as wireless device 210, which directly communicates with only wireless device 220) are configured and function in substantially the same manner as wireless device 240. FIG. 3 shows that wireless devices 210 and 220 form a first beacon group and wireless device 230 forms a separate second beacon group.

As will be appreciated by those skilled in the art, one or more of the various "parts" shown in FIG. 3 may be physically implemented using a software-controlled microprocessor, hard-wired logic circuits, or a combination thereof. Also, while the parts are functionally segregated in FIG. 3 for explanation purposes, they may be combined variously in any physical implementation.

Wireless device 240 includes transceiver 244, processor 246, memory 248, and antenna system 242. Transceiver 244 includes a receiver 243 and a transmitter 245, and provides functionality for wireless device 240 to communicate with other wireless devices, such as wireless devices 220 and 230, over wireless communication network 200 according to the appropriate standard protocols.

Processor 246 is configured to execute one or more software algorithms, including the beacon group merging algorithm of the embodiments described herein, in conjunction with memory 248 to provide the functionality of wireless device 240. The merging algorithm may be software control of antenna system 242, which may be a beam-steering or beam-switching antenna, for example, implemented in the medium access control (MAC) layer. Processor 246 may include its own memory (e.g., nonvolatile memory) for storing executable software code that allows it to perform the various functions of wireless device 240, discussed herein. Alternatively, the executable code may be stored in designated memory locations within memory 248.

In FIG. 3, antenna system 242 includes a directional antenna system, which provides a capability for the device 240 to select from multiple antenna beams for communicating with other wireless devices in multiple directions. For example, as stated above, antenna system 242 may be a beam-steering or beam-switching antenna. Accordingly, the antenna system 242 may include multiple antennas, each corresponding to one antenna beam, or antenna system 242 may include a steering antenna or antenna array that can combine multiple different antenna elements to form a beam in different directions.

The antenna system 242 operates various sectors corresponding to the directions in which the antenna system 242 may be directed. For example, referring to FIG. 2, the antenna system 242 of wireless device 240 may have four antenna sectors A-D. For purposes of simplifying explanation, the representative sectors A-D are evenly distributed in four quadrants surrounding wireless device 240 and are depicted in two dimensions. Actual sectors may have differing and/or overlapping coverage extending in three dimensions.

As previously mentioned, the wireless devices have different types of antennas, and different numbers and distributions of antenna sectors. For example, FIG. 2 depicts wireless device 230 as also having a steerable directional antenna system with four sectors A-D. However, wireless devices 210 and 220 have fixed directional antenna systems, and therefore do not steer or otherwise redirect antenna beams in any direction other than that depicted. Accordingly, the beaconing of wireless devices 210 and 220 is somewhat simplified as compared to wireless device 230, for example, since the direction of the beacons do not need to be coordinated with respect to beacon timing.

Wireless device 240 is able to join either beacon group (e.g., the first beacon group including wireless devices 210 and 220 or the second beacon group including wireless device 230). If wireless device 240 joins the first beacon group, it is able to synchronize with wireless devices 210 and 220 by exchanging beacons with wireless device 220 (which in turn exchanges beacons with wireless device 210), as discussed above. Conventionally, though, once it joins the first beacon group, wireless device 240 is not able to communicate with wireless device 230 of the second beacon group. Likewise, if wireless device 240 joins the second beacon group, it is not able to communicate with the first beacon group. Thus, choosing between beacon groups would effectively partition the network to include two separate, unsynchronized beacon groups.

Also as discussed above, wireless device 240 may decide to join both beacon groups, e.g., by sending a first response beacon to the first beacon group (e.g., to wireless device 220) and a second response beacon to the second beacon group (e.g., to wireless device 230). However, the two beacon groups are still unsynchronized and wireless device 240 must separately coordinate with two separate beacon groups.

In order to avoid partitioning and/or simultaneous operation of unsynchronized beacon groups, the beacon groups may be merged, e.g., by relocating transmit beacons of at least the fixed antenna wireless devices, according to various embodiments. The relocated beacons are depicted, for example, in FIGS. 4A-4C, and the merging process is described in the flowcharts of FIGS. 5 and 6.

Figure 4A:
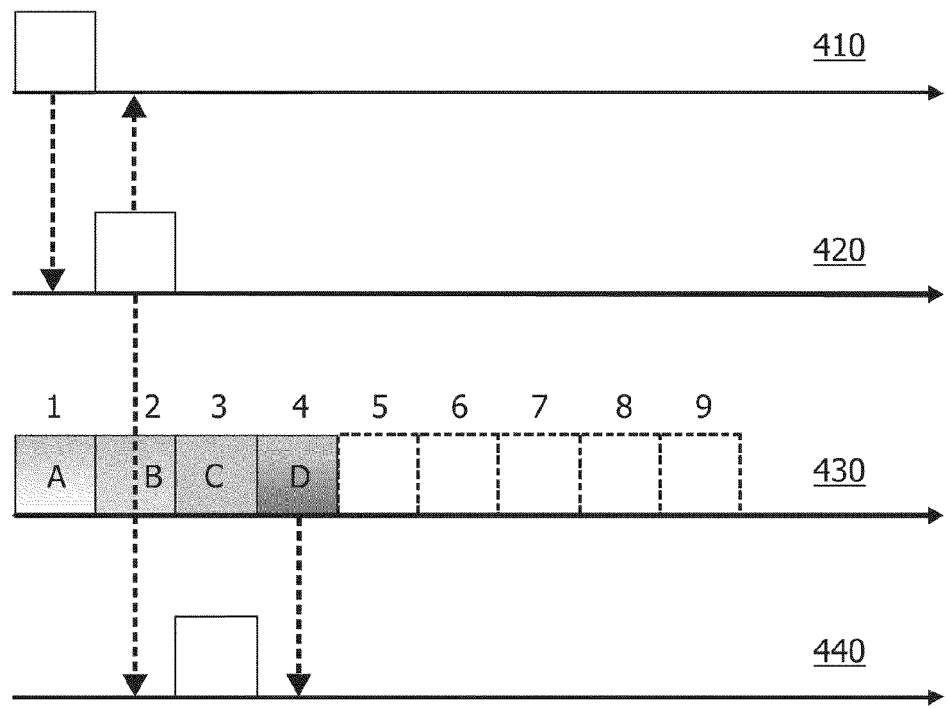
FIGS. 4A-4C are block diagrams of beaconing by wireless devices in separate beacon groups according to an embodiment.
Figure 4B:
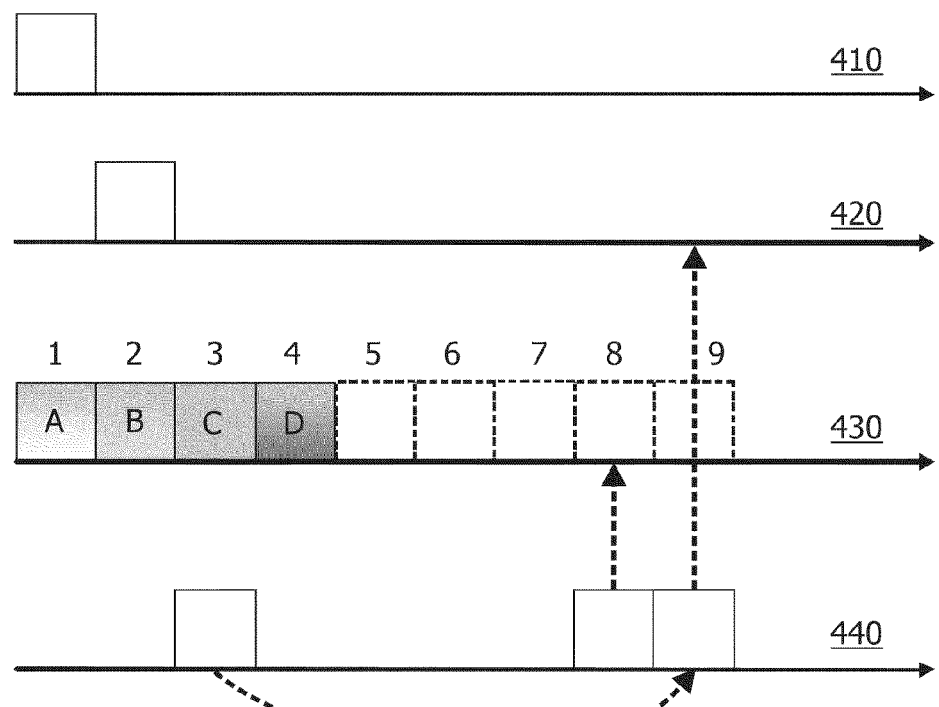
Figure 4C:
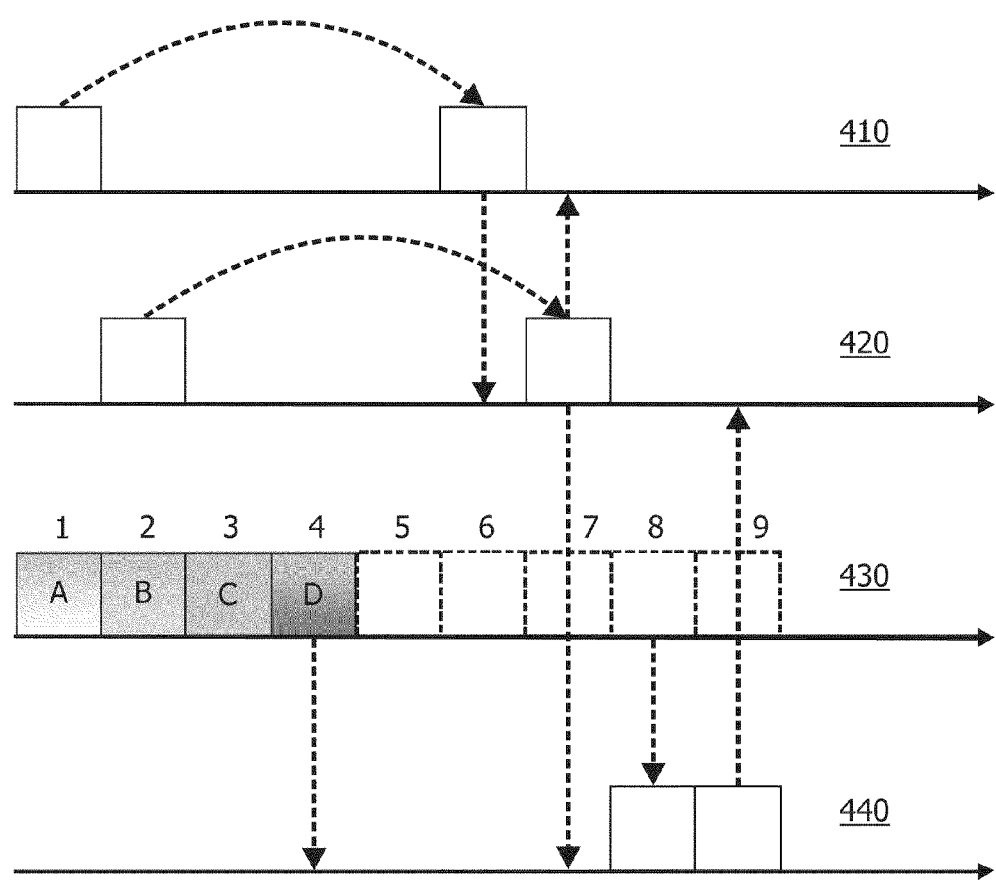

FIGS. 4A-4C are block diagrams of operational time lines 410, 420, 430 and 440, which respectively correspond to signals sent and/or received by wireless devices 210, 220, 230 and 240, respectively. Each time line depicts consecutive beaconing time slots in corresponding superframes, according to various embodiments. FIGS. 4A-4C depict events in chronological order, although they do not necessarily show consecutive superframes. In other words, various embodiments may include an intermediate number of superframes between the superframes in which the depicted actions occur, for example, depending on the communication protocol being used. Likewise, the number and size of time slots within the beaconing periods may vary, without departing from the spirit and scope of the present invention.

Figure 5:
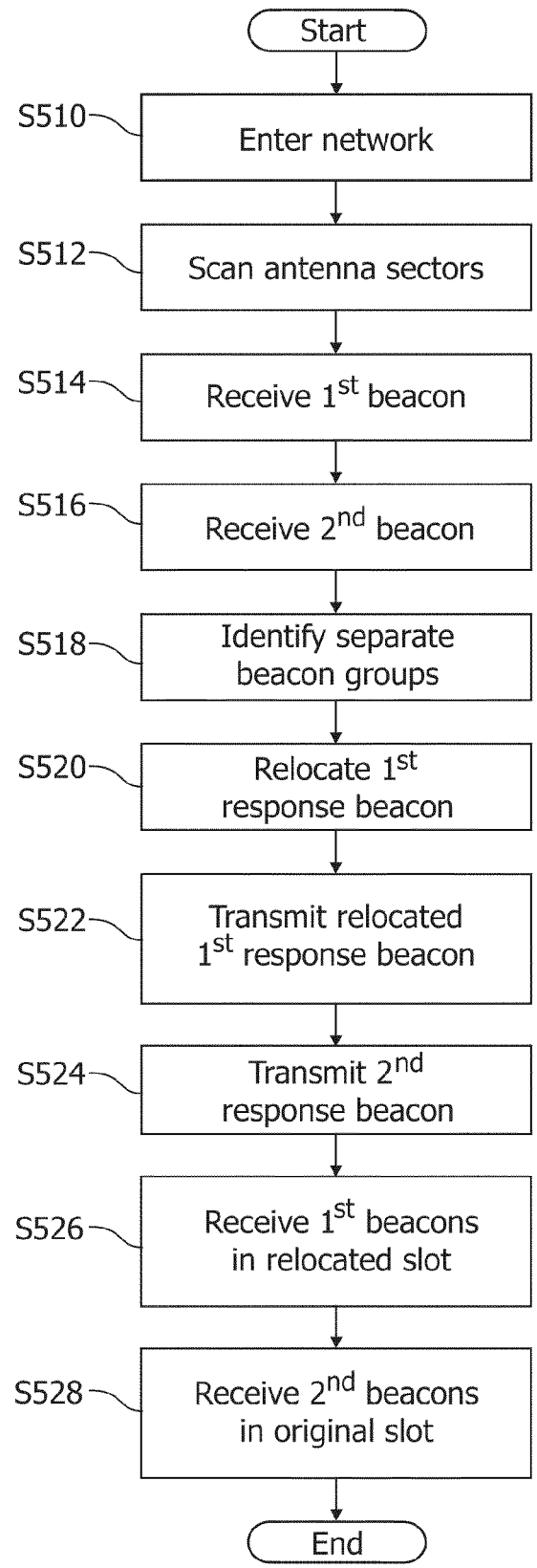
FIG. 5 is a flow chart of a wireless device beacon relocation process according to various embodiments.

Referring to FIG. 5, wireless device 240 enters the network at step S510, for example, by powering on within the network, physically moving within the network area, awakening from hibernation, or the like. At step S512, wireless device 240 begins scanning its various antenna sectors, sectors A-D to listen for beacons from other wireless devices. As previously stated, wireless device 240 is within the fixed directional antenna sector of wireless device 220 and within antenna sector D of wireless device 230. Accordingly, wireless device 240 receives a first beacon from wireless device 220 at step S514 and a second beacon from wireless device 230 at step S516.

FIG. 4A shows the wireless devices initially sending and receiving beacons. As stated above, wireless device 240 receives beacons from wireless devices 220 and 230, indicated by the respective dashed arrows from time lines 420 and 430 to time line 440. Because wireless device 230 has a steerable directional antenna, wireless device 240 receives its transmit beacon (e.g., the second beacon) in time slot 4 (of exemplary time slots 1-9), which corresponds to wireless device 230 transmitting in antenna sector D. In contrast, the timing of the first beacon from wireless device 220 is not as significant, since it has a fixed antenna system and is not transmitting in different antenna sectors. For purposes of explanation, the transmit beacon from wireless device 220 is shown as occurring at a time corresponding to slot 2 of time line 430, although it is understood that the beacon timing and/or the numbering of the superframe beacon slots may differ.

The slots indicated by dashed lines (slots 5-9) following transmit beacon slots A-D (slots 1-4) of time line 430 represent the next consecutive slots the superframe of wireless device 230, although it is understood that numerous additional timeslots (not shown), such as data slots, may occur in each superframe. The time slots may vary in size, without departing from the spirit and scope of the embodiments. For example, the number of slots per superframe and/or length of time of each time slot may be adjusted to provide unique benefits for any particular situation or to meet various design requirements.

In addition to transmitting a beacon to wireless device 240, wireless device 220 also transmits a beacon to wireless device 210, which corresponds to time line 410, in the same time slot. Likewise, wireless device 210 transmits a beacon to wireless device 220, which for purpose of explanation, is shown to occur at a time corresponding to slot 1 of time line 430. The exchange of beacons between wireless devices 210 and 220 is internal to the first beacon group, since neither wireless device 230 nor wireless device 240 is able to see wireless device 210.

Referring again to FIG. 5, at step S518, wireless device 240 determines that it has received beacons from two unsynchronized beacon groups. It may also determine, e.g., based on information provided in the first beacon, that wireless device 220 of the first beacon group has a fixed directional antenna, so there is flexibility in the timing of sending first response beacon. Wireless device 240 may also determine, e.g., based on information provided in the second beacon, that wireless device 230 of the second beacon group has a steerable directional antenna, which requires specific timing of a response beacon to assure that the antenna of wireless device 230 is directed to the appropriate antenna sector (sector D) when wireless device 240 sends the second response beacon.

In order to synchronize the first and second beacon groups, the wireless device 240 coordinates relocating the beacons to be sent to and received from the fixed antenna wireless devices (e.g., wireless device 220). Therefore, at step S520, wireless device 240 relocates its first response beacon to another time slot, and sends the relocated first response beacon to wireless device 220 of the first beacon group at step S522. The first response beacon includes information telling the wireless device 220 to relocate its first beacon in subsequent superframes, as discussed below with respect to FIG. 4C and FIG. 6.

However, beacons from steerable antenna devices (e.g., wireless device 230), however, cannot be relocated. Therefore, at step S524, wireless device 240 transmits a second response beacon to wireless device 230 of the second beacon group in the time slot allocated by the second beacon received at step S516. In an embodiment, the exchange of beacons and time slot allocation between wireless devices 230 and 240 may be accomplished, for example, in accordance with U.S. Provisional Application entitled, "Apparatus and Method for Enabling Discovery of Wireless Devices," by Richard Chen and Chun-Ting Chou, mentioned above, the subject matter of which is hereby incorporated by reference. Wireless device 240 receives subsequent first beacons from wireless device 220 in the relocated time slot at step S526. Wireless device 240 continues to receive subsequent second beacons from wireless device 230 in the original beacon time slot at step S528.

FIG. 4B shows wireless device 240 sending response beacons to the first and second beacon groups. As indicated by the dashed arrow below time line 440, the time slot in which wireless device 240 would usually respond to the first beacon from wireless device 220 is relocated, e.g., from a time corresponding to slot 3 of time line 430 to a time corresponding to slot 9 of time line 430. The first response beacon is sent to wireless device 220 in the relocated time slot (corresponding to slot 9), indicated by the dashed arrow extending to time line 420. In an alternative embodiment, the first response beacon may be sent in the usual response time slot (e.g., corresponding to slot 3), and identify the relocated time slot in which subsequent first response beacons will be sent. The second response beacon is sent to wireless device 230 in the originally allocated timeslot (corresponding to slot 8), indicated by the dashed arrow extending to time line 430.

The first response beacon sent to wireless device 420 includes information regarding merging the two beacon groups. For example, the initial first response beacon may inform wireless device 420 that it must relocate its future first beacons. The initial first response beacon may also identify the time slot to which the first beacon must be moved, or alternatively, the first response beacon may simply identify the time slots that are not available. For example, the unavailable time slots include slot 4 during which wireless device 230 sends second beacons to wireless device 240, slot 8 during which wireless device 240 sends second response beacons to wireless device 230, and slot 9 during which wireless device 240 sends subsequent first response beacons to wireless device 220. In an embodiment, however, wireless device 240 may send subsequent first response beacons to wireless device 220 in slot 8, at the same time it sends subsequent second response beacons to wireless device 230, thus freeing slot 9 for relocation of beacons from other devices.

The first response beacon sent to wireless device 220 may also include additional information, such as identification of wireless device 230, identification of the second beacon group, the number of wireless devices in the second beacon group, and the like. Once wireless device 220 selects and/or is assigned a relocated time slot in which to transmit subsequent first beacons, it informs the other wireless devices with which it communicates of the relocated time slot.

FIG. 4C shows the relocation of beacons for wireless devices 210 and 220, as a result of the first response beacon received from wireless device 240. More particularly, after receiving the relocated first response beacon from wireless device 240, wireless device 220 informs the other wireless devices in the first beacon group (e.g., wireless device 210) of the merging operation in beacons transmitted within the first beacon group. The beacons include information regarding relocation, such as the identity of the time slot to which wireless device 220 intends to relocate its transmit (and receive) beacons, and the time slots to which the other wireless devices (e.g., wireless device 210) must relocate their transmit (and receive) beacons. Alternatively, the beacons from wireless device 220 may only identify time slots that are not available, so that each remaining wireless device in the first beacon group selects its own relocated beacon time slot and informs the other wireless devices of its selection, accordingly. If there are additional wireless devices in the first beacon, the wireless devices already informed of the merging operation (e.g., wireless devices 210 and/or 220) would inform the other wireless devices with which they can communicate, so that ultimately all wireless device in the first beacon group have appropriately relocated their beacons.

In the depicted example, wireless device 220 relocates its transmit beacon from a time corresponding to slot 2 to a time corresponding to slot 7 of time line 430, and wireless device 210 relocates its transmit beacon from a time corresponding to slot 1 to a time corresponding to slot 6 of time line 430, as indicated by the dashed arrows above time lines 420 and 410, respectively. Wireless devices 210, 220 and 240 then send (and receive) subsequent beacons in their respective relocated time slots. Eventually, all of the wireless devices will be beaconing in a single beacon group, concluding the relocation process.

As mentioned above, the relocation of the beacons does not necessarily occur in the next consecutive superframe of the various wireless devices. For example, after receiving notice from the initial first response beacon from wireless device 240 that the beacon groups are being merged, wireless device 220 may wait a predetermined number of superframes (e.g., nine superframes in accordance with the WiMedia UWB protocol) before relocating its beacons and/or informing other devices in the first beacon group that their respective beacons must be relocated.

In an embodiment, the beacon groups may be merged without the wireless devices having to change same time slots, as long as the transmit/receive beacons of the groups do not interfere with one another. For example, FIGS. 4A-4C actually depict a situation in which wireless devices 210, 220 and 240 do not necessarily need to relocate their beacons to different time slots, since the timing of the original beacons does not overlap. Referring to the time periods indicated in time line 430, wireless device 210 (time line 410) sends its beacon in slot 1, wireless device 220 (time line 420) sends its beacons in slot 2, wireless device 230 (time line 430) sends its beacon in antenna sector D in slot 4, and wireless device 240 (time line 440) may send its response beacon to wireless device 220 in slot 3. (Wireless device 240 will still send its response beacon to wireless device 230 in slot 8, as dictated by the antenna sweeping different antenna sectors at different times.)

Accordingly, relocation to enable merging of the two beacon groups may involve simply renumbering the time slots of the first beacon group to coincide with the time slot numbers of the second beacon group. For example, referring to FIG. 4A, the left-most time slot on time line 420 may actually be time slot 5, for example, of a superframe transmitted from wireless devices 220, which corresponds in time to slot number 1 of wireless device 230. Therefore, wireless device 220 transmits its beacons (e.g., to wireless devices 210 and 240) in its original slot number 6, which corresponds in time to slot number 2 of wireless device 230. Accordingly, the beacon groups may be synchronized, in part, by wireless device 220 renumbering its superframe slots, such that its slot 6 is now slot 2, in order to correspond to the slot numbering of wireless device 230. Likewise, wireless device 210 may renumber its superframe slots, such that its original slot 5 is now slot 1. In this way, wireless devices 210 and 220 do not have to change the actual time at which they send beacons, only the numbering of their beacon slots, to enable the merger. This enables the spatial reuse of beacon slots and further reduces the waste of medium time.

Figure 6:
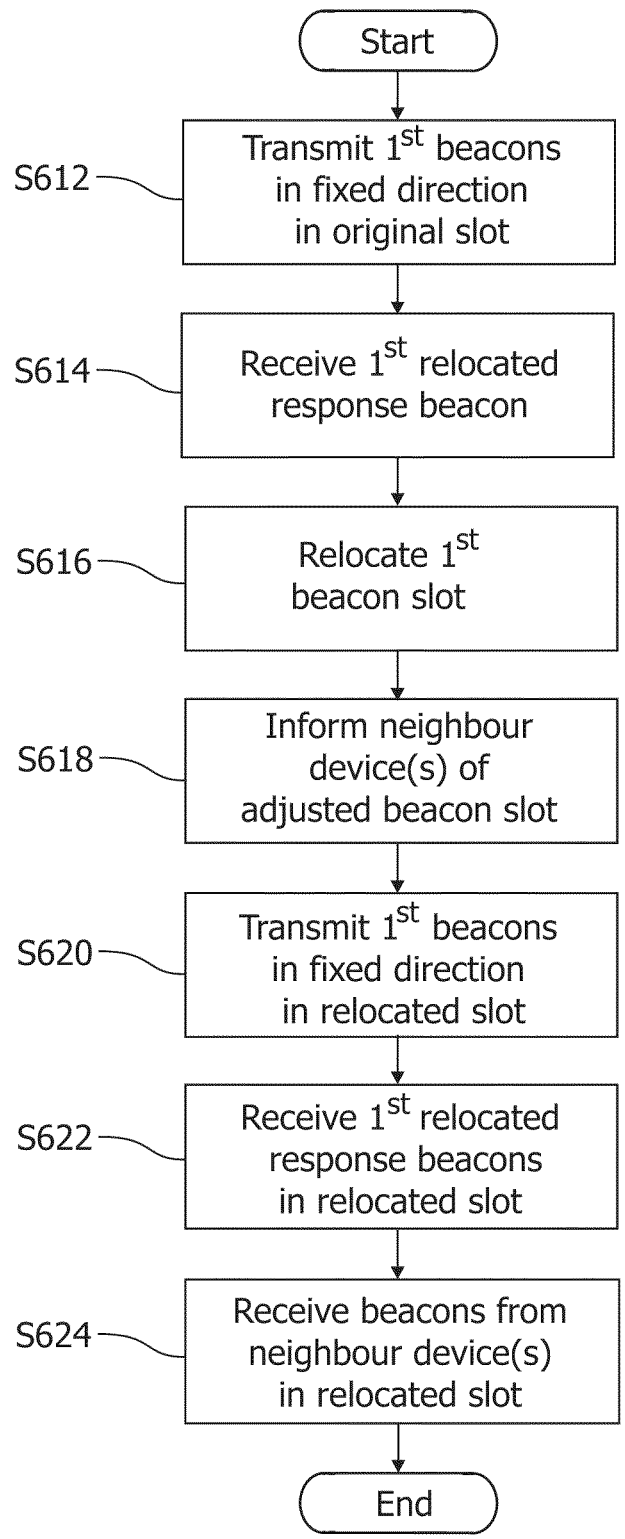
FIG. 6 is a flow chart of a wireless device beacon relocation process according to various embodiments.

FIG. 6 is a complementary flowchart to FIG. 5, depicting the beacon group merging process in a wireless device having a fixed directional antenna (e.g., wireless device 220), according to an embodiment. At step S612, wireless device 220 transmits beacons in a fixed direction from its directional antenna. Each beacon is included in a predetermined slot of each superframe. In response, wireless device 220 receives responsive beacons from other devices, such as wireless device 210 (not shown in FIG. 6), forming the first beacon group.

At step S614, wireless device 220 receives a relocated response beacon (e.g., a relocated first response beacon) from wireless device 240, which is common to the first beacon group and a second beacon group, of which wireless device 220 had been previously unaware. The second beacon group includes a device having a steerable directional antenna (e.g., wireless device 230), as discussed above. The first response beacon indicates a merging process, and includes information regarding relocation of beacons to accommodate the second beacon group. As stated above, the information may identify a specific time slot to which wireless device 220 must relocate its subsequent transmit beacons, or the information may identify time slots that are already occupied, enabling wireless device 200 to determine its own relocation time slot. Wireless device 220 relocates its beacon at step S616.

At step S618, wireless device 220 sends beacons to its neighbor devices (e.g., wireless device 210) in the first beacon group, informing them that it is relocating its beacon slot, identifying its relocated beacon slot, and informing them that they must likewise relocate their beacons. For example, a subsequent beacon from wireless device 220 to wireless device 210 may indicate the merging process and include information regarding the relocation of beacons to accommodate the newly identified second beacon group. As stated above, the information may identify a specific time slot to which wireless device 210 must relocate its subsequent transmit beacons, or the information may identify time slots that are already occupied, enabling wireless device 210 to determine its relocation time slot. Wireless device 210 subsequently relocates its beacon, as well, and informs wireless device 220 that the beacon relocation is complete and/or of the new beacon location.

It is possible that there are additional wireless devices in the first beacon group with which wireless device 210 communicates, but wireless device 220 is unable to directly communicate. Therefore, wireless device 210 sends beacons to its neighbor devices (not in communication with wireless device 220), likewise informing them that it is relocating its beacon slot, identifying its relocated beacon slot, informing them that they must likewise relocate their beacons and/or informing them of the merger with the second beacon group. In this manner, all wireless devices in the first beacon group are eventually synchronized with the second beacon group.

At step S620, wireless device 220 transmits subsequent first beacons, e.g., to wireless device 240, which is common to both the first and second beacon groups, in its relocated beacon slot. Wireless device 220 also receives subsequent first response beacons from wireless device 240 and subsequent response beacons from wireless device 210 in corresponding relocated beacon slots, in steps S622 and S624, respectively. Accordingly, the first and second beacon groups are synchronized, enabling a merger into a single beacon group.

According to the exemplary embodiments, wireless devices in separate, unsynchronized beacon groups, such as representative wireless devices 210, 220 in a first beacon group and wireless device 230 in a second beacon, are able to discover one another and merge into a synchronized combined beacon group, e.g., for purposes of exchanging information, via a common neighbor device, such as representative wireless device 240. Therefore, wireless devices in proximity, regardless of topology, will be well connected and the network will not be partitioned. Also, the common neighbor devices, which can communicate with both original beacon groups, do not have to send multiple beacons to multiple unsynchronized beacon groups, wasting time and potentially causing interference. Examples are provided herein for illustration purposes and are not to be construed as limiting the scope of the teachings of this specification, or the claims to follow.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of merging a plurality of unsynchronized beacon groups in a wireless network, each beacon group comprising at least one wireless device, the method comprising:
receiving a first beacon from at least one first wireless device in a first beacon group, the first wireless device having a first directional antenna;
receiving a second beacon from at least one second wireless device in a second beacon group that is not synchronized with the first beacon group, the second wireless device having a second directional antenna; and
selecting the first beacon group for beacon relocation based on the received first beacon, which indicates that the first beacon group has flexibility in a timing of sending a response beacon;
relocating a first response beacon responsive to the received first beacon and sending the relocated first response beacon to the first wireless device in the first beacon group, the relocated first response beacon instructing the first wireless device to relocate the first beacon,
wherein the second beacon, the relocated first response beacon, and the relocated first beacon are synchronized.

2. The method of claim 1, wherein the first response beacon and the first beacon are relocated to respective times during which the second beacon of the second wireless device is not being sent.

3. The method of claim 1, further comprising:
sending a second response beacon to the second wireless device at a time indicated by the second beacon.

4. The method of claim 3, wherein the first response beacon and the first beacon are relocated to respective times during which the second beacon of the second wireless device and the second response beacon are not being sent.

5. The method of claim 1, wherein the first wireless device in the first beacon group instructs at least one other first wireless device in the first beacon group to relocate its corresponding first beacon, in response to the relocated first response beacon.

6. The method of claim 5, wherein the first wireless device instructs the at least one other first wireless device in the first beacon group to relocate its corresponding first beacon following a predetermined waiting period after receiving the relocated first response beacon.

7. The method of claim 6, wherein the predetermined waiting period comprises a plurality of superframes.

8. The method of claim 1, further comprising:
determining whether an original time slot of the first beacon in the first beacon group corresponds to an available time slot in the second beacon group.

9. The method of claim 8, wherein when the original time slot of the first beacon corresponds to an available time slot in the second beacon group, the first wireless device relocates the first beacon by renumbering the original time slot to match a number of the available time slot in the second beacon group.

10. The method of claim 8, wherein when the original time slot of the first beacon does not correspond to an available time slot in the second beacon group, the first wireless device relocates the first beacon by moving the first beacon to a different time slot corresponding to an available time slot in the second beacon group.

11. The method of claim 1, wherein the first directional antenna comprises a fixed beam antenna and the second directional antenna comprises a steerable antenna.

12. The method of claim 11, wherein the steerable antenna comprises one of a steering beam antenna and a switching beam antenna.

13. An apparatus configured to merge a plurality of unsynchronized beacon groups in a wireless network, each beacon group comprising at least one wireless device, the apparatus comprising:
a transceiver configured to receive a first beacon from at least one first wireless device in a first beacon group, the first wireless device having a first directional antenna, and to receive a second beacon from at least one second wireless device in a second beacon group that is not synchronized with the first beacon group, the second wireless device having a second directional antenna; and
a processor configured to select the first beacon group for beacon relocation based on the received first beacon, which indicates that the first beacon group has flexibility in a timing of sending a response beacon, and to synchronize a timing of a first response beacon, responsive to the first beacon, with a timing of the second beacon by relocating the first response beacon,
wherein the transceiver sends the relocated first response beacon to the first wireless device in the first beacon group, the relocated first response beacon informing the first wireless device to synchronize a timing of the first beacon with the timing of the second beacon by relocating the first beacon.

14. The apparatus method of claim 13, further comprising:
a directional antenna system configured to communicate over the wireless network in a plurality of antenna sectors, the transceiver receiving the first and second beacons and sending the relocated first responsive beacon through the directional antenna system.

15. The method of claim 14, wherein the directional antenna system comprises one of a steering beam antenna and a switching beam antenna.

16. The apparatus of claim 15, wherein the first directional antenna of the first wireless device comprises a fixed beam antenna and the second directional antenna of the second wireless device comprises a steerable antenna.

17. The apparatus of claim 13, wherein the first wireless device in the first beacon group informs at least one other first wireless device in the first beacon group to relocate its corresponding first beacon, in response to the relocated first response beacon.

18. A method of merging a plurality of unsynchronized beacon groups in a wireless network, each beacon group comprising at least one wireless device, the method comprising:
sending a first beacon through a directional antenna of a first wireless device in a first beacon group to a common wireless device, capable of communicating with the first beacon group and a second beacon group unsynchronized with the first beacon group;
selecting the first beacon group for beacon relocation based on the received first beacon, which indicates that the first beacon group has flexibility in a timing of sending a response beacon;
receiving a relocated first response beacon from the common wireless device in response to the first beacon, the relocated first response beacon identifying the second beacon group and providing instructions to relocate subsequent first beacons to synchronize with at least second beacons of a second wireless device in the second beacon group being sent to the common wireless device; and informing at least one other wireless device in the first beacon group of the second beacon group and instructing the at least one other wireless device to relocate beacons transmitted from the at least one other wireless device to synchronize with at least the relocated subsequent first beacons and the second beacons.

19. The method of claim 18, further comprising:
waiting a predetermined period of time before instructing the at least one other wireless device in the first beacon group to relocate the beacons transmitted from the at least one other wireless device.

20. The method of claim 19, wherein sending the relocated subsequent first beacons, receiving relocated subsequent first response beacons from the common wireless device and receiving relocated beacons from the at last one other wireless device in the first beacon group does not interfere with the second beacons.

* * * * *